US009560351B1

(12) United States Patent
Linzer et al.

(10) Patent No.: US 9,560,351 B1
(45) Date of Patent: Jan. 31, 2017

(54) LOW COST RATE-DISTORTION COMPUTATIONS FOR VIDEO COMPRESSION

(71) Applicant: Ambarella, Inc., Santa Clara, CA (US)

(72) Inventors: Elliot N. Linzer, Bergenfield, NY (US); Hsiang-Chun Huang, Hsinchu County (TW)

(73) Assignee: Ambarella, Inc., Santa Clara, CA (US)

( * ) Notice: Subject to any disclaimer, the term of this patent is extended or adjusted under 35 U.S.C. 154(b) by 481 days.

(21) Appl. No.: 14/136,409

(22) Filed: Dec. 20, 2013

Related U.S. Application Data

(63) Continuation of application No. 12/640,415, filed on Dec. 17, 2009, now Pat. No. 8,654,859.

(51) Int. Cl.
   *H04N 7/12* (2006.01)
   *H04N 19/50* (2014.01)

(52) U.S. Cl.
   CPC ............................ *H04N 19/00569* (2013.01)

(58) Field of Classification Search
   CPC   H04N 19/00096; H04N 19/103; H04N 19/14; H04N 19/147; H04N 19/156; H04N 19/176; H04N 19/18
   See application file for complete search history.

(56) References Cited

U.S. PATENT DOCUMENTS

| | | | |
|---|---|---|---|
| 5,086,488 A | 2/1992 | Kato et al. | 382/239 |
| 5,799,110 A * | 8/1998 | Israelsen | G06T 9/008 375/E7.092 |
| 6,324,301 B1 | 11/2001 | Jacquin et al. | 382/166 |
| 6,826,526 B1 * | 11/2004 | Norimatsu | G10L 19/038 704/222 |
| 7,292,163 B1 | 11/2007 | Fedele | 341/67 |
| 7,606,427 B2 * | 10/2009 | Malayath | H04N 19/176 375/240.15 |
| 7,734,106 B1 * | 6/2010 | Zhang | H04N 19/176 382/236 |
| 7,991,237 B2 | 8/2011 | Sekiguchi et al. | 382/238 |
| 8,019,804 B2 | 9/2011 | Po et al. | 708/402 |
| 8,059,721 B2 | 11/2011 | Chang et al. | 375/240.18 |
| 9,031,128 B2 * | 5/2015 | Chiang | H04N 19/176 375/240.03 |
| 2001/0050959 A1 | 12/2001 | Nishio et al. | 375/243 |
| 2004/0240556 A1 | 12/2004 | Winger et al. | 375/240.18 |

(Continued)

OTHER PUBLICATIONS

T. Wiegand et al., "Rate-Constrained Coder Control and Comparison of Video Coding Standards", IEEE Transactions on Circuits and Systems for Video Technology, vol. 13, No. 7, Jul. 2003, pp. 1-19.

(Continued)

*Primary Examiner* — Nhon Diep

(74) *Attorney, Agent, or Firm* — Christopher P. Maiorana, PC

(57) ABSTRACT

A method of rate-distortion computations for video compression is disclosed. The method may include steps (A) to (C). Step (A) may generate a plurality of transform coefficients from a residual block of the video using a circuit. Step (B) may generate a block distortion value (i) based on the transform coefficients and (ii) independent of a plurality of inverse transform samples produced from the residual block. Step (C) may generate a rate-distortion value from the block distortion value.

20 Claims, 5 Drawing Sheets

(56) References Cited

U.S. PATENT DOCUMENTS

2005/0180500 A1    8/2005   Chiang et al. ............... 375/240

OTHER PUBLICATIONS

Y. Kim et al., "A Novel Linear Source Model and a Unified Rate Control Algorithm for H.263/MPEG-2/MPEG-4", in Proc. Int. Conf. Acoustics, Speech, and Signal Processing, Salt Lake City, UT, May 2001, pp. 1-4.

* cited by examiner

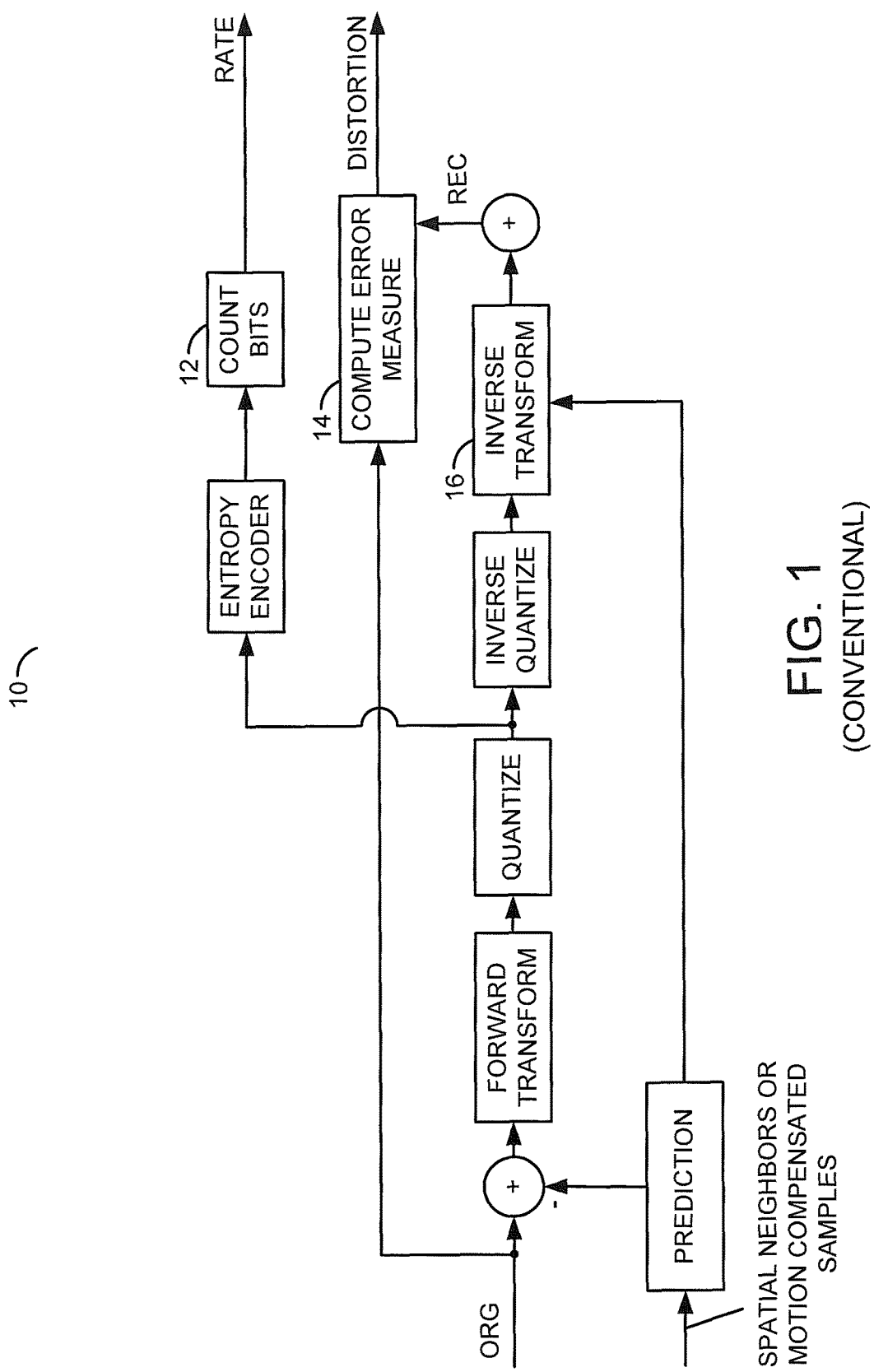
FIG. 1
(CONVENTIONAL)

LOW COST RATE-DISTORTION COMPUTATIONS FOR VIDEO COMPRESSION

This application relates to U.S. Ser. No. 12/640,415, filed Dec. 17, 2009, which is incorporated by reference in its entirety.

FIELD OF THE INVENTION

The present invention relates to a method and/or architecture for video encoding optimization generally and, more particularly, to low cost rate-distortion computations for video compression.

BACKGROUND OF THE INVENTION

Advanced video compression formats such as H.264 provide many different modes to encode macroblocks and the blocks within the macroblocks. Specifically, a conventional encoder decides if the macroblock/block should be encoded using inter prediction or intra prediction.

If intra prediction is selected, the encoder also chooses a particular block size to process. The common intra prediction block sizes are 4×4, 8×8 and 16×16. For each block, the encoder also chooses a particular direction along which to predict. The common intra prediction directions are vertical, horizontal, DC (i.e., no direction), diagonal down left, diagonal down right, vertical right, horizontal down, vertical left and horizontal up.

If inter prediction is selected, the encoder will determine if the macroblock should be encoded as a direct block or an inter block. If inter-block prediction is selected, the encoder determines one or two reference frames and a particular block size to process. Common inter prediction block sizes are 4×4, 4×8, 8×4, 8×8, 16×8, 8×16 and 16×16. Each reference frame used in the inter prediction is an actual frame or an interpolated version of an actual frame.

To achieve high compression efficiency, some encoders use a common Rate-Distortion Optimization (RDO) analysis. A best mode of at least two encoding modes is selected under RDO by computing, for each of the modes, (i) a measure of distortion that would result in a decoded picture using the mode, (ii) a measure of the number of bits (i.e., rate) that would be generated using the mode and (iii) a combined score based on the rate and the distortion. Typically, the combined score is a weighted sum of the rate and the distortion. The best mode is selected as the mode with the lowest score.

Referring to FIG. 1, a partial block diagram of a conventional RDO-based encoder 10 is shown. Blocks of original samples are received in a signal ORG. The RDO repeats the encoding process for the blocks in two or more modes to determine the best mode. The RDO adds a bit count 12 and an error measurement 14 to the conventional encoding process to evaluate the rate and the distortion. The bit count 12 counts the number of bits in an entropy encoded bitstream. The error measurement 14 calculates errors between the original samples in the signal ORG and reconstructed samples in a signal REC. The reconstructed samples are based on inverse transform samples calculated by an inverse transform circuit 16. The RDO analysis improves encoder efficiency to achieve a high quality decoded video sequence at a low bit rate. However, the RDO analysis involves many computations for each mode. Therefore, an encoder that employs RDO will be expensive and/or consume significant power.

It is desirable to have an encoder with the compression benefits of RDO at a lower expense.

SUMMARY OF THE INVENTION

The present invention concerns a method of rate-distortion computations for video compression. The method may include steps (A) to (C). Step (A) may generate a plurality of transform coefficients from a residual block of the video using a circuit. Step (B) may generate a block distortion value (i) based on the transform coefficients and (ii) independent of a plurality of inverse transform samples produced from the residual block. Step (C) may generate a rate-distortion value from the block distortion value.

The objects, features and advantages of the present invention include providing a low cost rate-distortion computations for video compression that may (i) calculate a distortion independent of inverse transform samples, (ii) compute the distortion based on differences between the quantized and inverse quantized transform coefficients, (iii) compute the distortion based on roundoffs caused by the quantization, (iv) calculate a rate by counting non-zero quantized transform coefficients, (v) perform a nonlinear lookup translation of the non-zero quantized transform coefficients and/or (vi) implement a rate-distortion optimization at lower cost than conventional techniques.

BRIEF DESCRIPTION OF THE DRAWINGS

These and other objects, features and advantages of the present invention will be apparent from the following detailed description and the appended claims and drawings in which:

FIG. 1 is a partial block diagram of a conventional rate-distortion optimized based encoder;

DETAILED DESCRIPTION OF THE PREFERRED EMBODIMENTS

Figure 2:
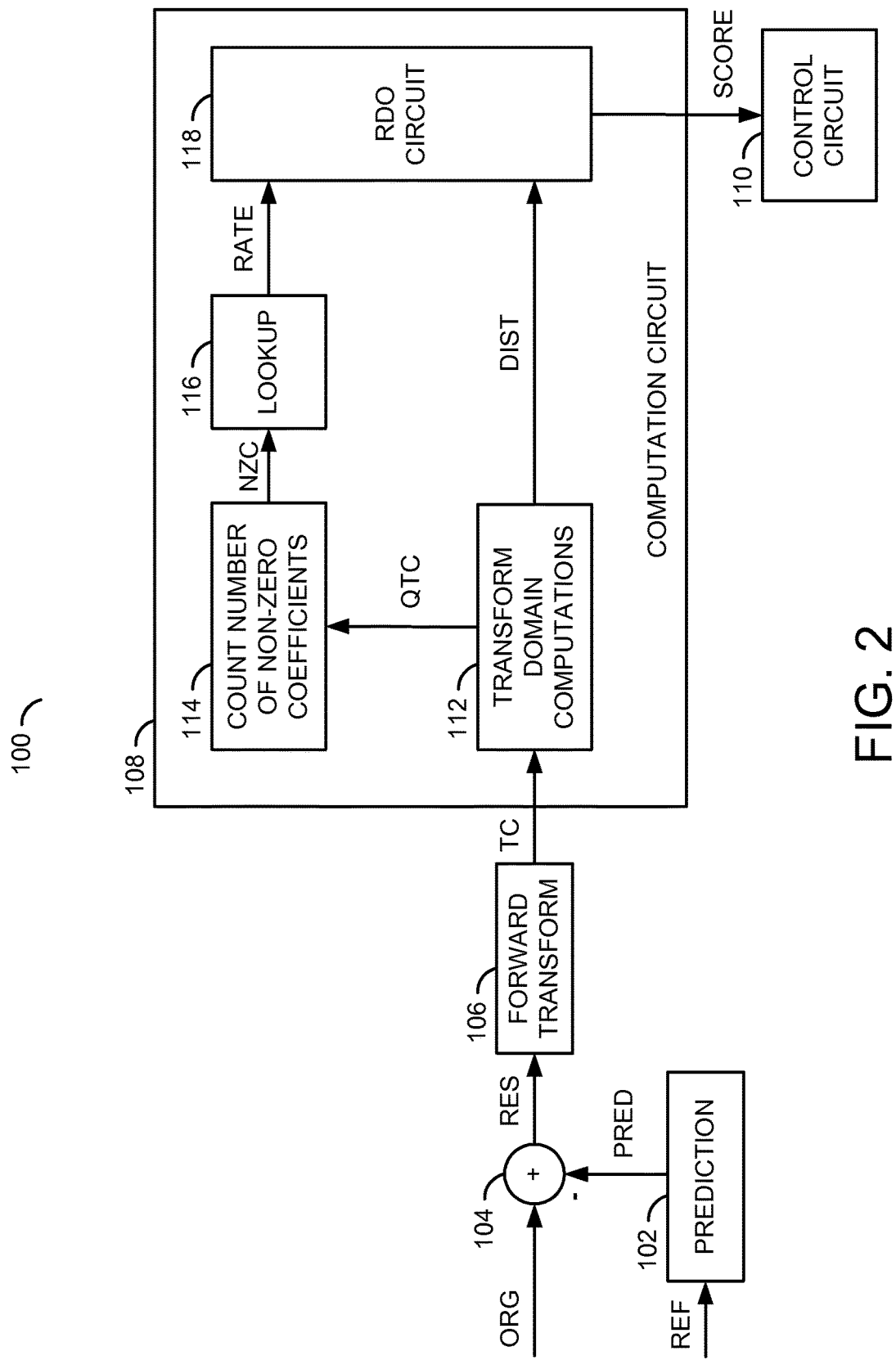
FIG. 2 is a partial block diagram of an apparatus in accordance with a preferred embodiment of the present invention.

Referring to FIG. 2, a partial block diagram of an apparatus 100 is shown in accordance with a preferred embodiment of the present invention. The apparatus (or device) 100 generally comprises a circuit (or module) 102, a circuit (or module) 104, a circuit (or module) 106, a circuit (or module) 108 and a circuit (or module) 110. A signal (e.g., REF) may be received by the circuit 102. The circuit 104 may receive a signal (e.g., ORG) at a first input. Another signal (e.g., PRED) may be generated by the circuit 102 and received at a second input of the circuit 104. The circuit 104 may generate a signal (e.g., RES) that is transferred to the circuit 106. A signal (e.g., TC) may be generated by the circuit 106 and presented to the circuit 108. The circuit 108 may generate a signal (e.g., SCORE) that is received by the circuit 110. The circuits 102-108 may perform a Rate-Distortion Optimization (RDO) to generate multiple scores for each video block to be encoded. An RDO score may be calculated for each block in each of several encoding modes available in the encoder. The circuits 102 to 110 may be implemented in hardware, software, firmware or any combination thereof.

The circuit 102 may implement a prediction circuit. The circuit 102 is generally operational to create predicted blocks from reference samples of one or more reference images (frames, fields, or pictures) received in the signal REF or other parts of the image being processed. The predictions may be based on spatial neighboring samples and/or motion compensated samples. The predicted blocks are generally the same shape and size as corresponding macroblocks/blocks of original image samples conveyed in the signal ORG. The predicted blocks may be transferred to the circuit 104 in the signal PRED. The predicted block sizes and shapes may include, but are not limited to, 4×4, 4×8, 8×4, 8×8, 16×8, 8×16 and 16×16 samples (e.g., luminance samples and/or chrominance samples). Hereafter, the original macroblocks/blocks may be referred to as just blocks.

The circuit 104 may implement a subtraction circuit. The circuit 104 is generally operational to subtract the predicted blocks from the corresponding original blocks in the signal ORG to compute residual blocks. The residual blocks may be transferred from the circuit 104 to the circuit 106 in the signal RES.

The circuit 106 may implement a transform circuit. The circuit 106 is generally operational to transform the residual blocks from a spatial domain into one or more sets of transform coefficients that represent the residual blocks in a frequency domain. In some embodiments, the transformation may be implemented as a discrete cosine transformation. In other embodiments, the transformation may be implemented as an integer transformation. The transform coefficients may be presented to the circuit 108 in the signal TC.

The circuit 108 may implement a computation circuit. The circuit 108 is generally operational to calculate a final score for each given residual block processed by the circuits 102-106. Each final score generally expresses how well the given block could be encoded in a corresponding mode. The quality of the encoding is based on both (i) a distortion factor that indicates how much distortion has been introduced by the encoding and (ii) a bit rate that would be used to represent the transform coefficients. The distortion factor is generally computed in the transform (frequency) domain of the transform coefficients independent of an inverse transform (e.g., FIG. 1 box 16) to reconstruct the residual block samples. The transform domain processing generally reduces a cost of computing an RDO score for each mode. The bit rate may be estimated from counting a number of non-zero quantized transform coefficients. The final score of each residual block per encoding mode may be presented in the signal SCORE to the circuit 110.

The circuit 110 may implement an encoder control circuit. The circuit 110 is generally operational to control the overall operations of the encoding process of the apparatus 100. Control generally includes (i) encoding mode determinations (e.g., intra or inter prediction), (ii) block size selections, (iii) intra prediction direction determinations, (iv) reference frame selections, (v) quantization parameter determinations and the like. Furthermore, the circuit 110 may determine two or more modes with associated parameters to encode each original block. Based on the scores of each given block in each mode, the circuit 110 may select a best mode. The best mode may be selected on a block-by-block basis, a group of pictures-by-group of pictures basis, a slice-by-slice basis, a field-by-field basis and/or a frame-by-frame basis. The circuit 110 may subsequently control the apparatus 100 to use the best mode to finalize encoding of the corresponding block.

The circuit 108 generally comprises a circuit (or module) 112, a circuit (or module) 114, a circuit (or module) 116 and a circuit (or module) 118. The signal TC may be received by the circuit 112. A signal (e.g., QTC) may be generated by the circuit 112 and received by the circuit 114. Another signal (e.g., DIST) may be generated by the circuit 112 and received by the circuit 118. The circuit 114 may generate a signal (e.g., NZC) that is transferred to the circuit 116. A signal (e.g., RATE) may be generated by the circuit 116 and received by the circuit 118. The circuit 118 may generate the signal SCORE. The circuits 112 to 118 may be implemented in hardware, software, firmware or any combination thereof.

The circuit 112 may implement a transform domain computation circuit. The circuit 112 is generally operational to quantize the transform coefficients received in the signal TC, as controlled by the circuit 110. The quantized transform coefficients may be conveyed to the circuit 114 in the signal QTC. The circuit 112 may also be operational to compute a block distortion value of each residual block based on the transform coefficients. The block distortion values may be presented in the signal DIST to the circuit 118.

The circuit 114 may implement a counter circuit. The circuit 114 is generally operational to count a number of quantized transform coefficients in each residual block that have non-zero values. The non-zero count value per block may be presented in the signal NZC to the circuit 116.

Figure 3:
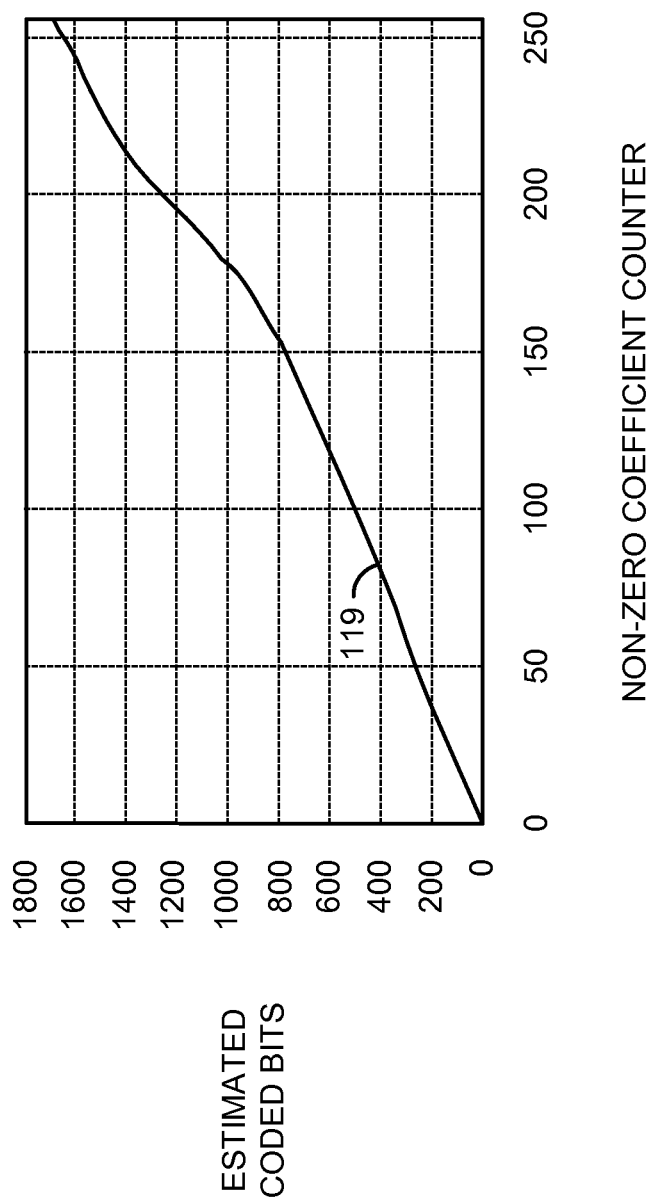
FIG. 3 is a diagram of an example estimate of a number of coded bits as a function of a number of non-zero coefficients.

Referring to FIG. 3, a diagram of an example estimate of a number of coded bits as a function of a number of non-zero coefficients is shown. Curve 119 generally illustrates a relationship between the non-zero coefficient count and the final number of coded bits. The number of bits used to code the quantized transform coefficients generally increases as the non-zero count increases.

Returning to FIG. 2, the circuit 116 may implement a lookup table. The circuit 116 is generally operational to perform a nonlinear translation of the non-zero count values received in the signal NZC into rate values. The lookup translation (operation) may correct small nonlinear discrepancies between the count of non-zero coefficients and the number of bits used to code the non-zero coefficients (e.g., curve 119). Using the lookup may result in a more precise estimate of the number of bits compared with linear mapping techniques.

The circuit 118 may implement a rate-distortion optimization circuit. The circuit 118 is generally operational to calculate the final score for each block. The final score is generally transferred to the circuit 110 in the signal SCORE. A combination of the rate value and the block distortion value of a particular block may represent the final score of the particular block. In some embodiments, the combination may be a weighted sum of the rate value and the block distortion value.

Figure 4:
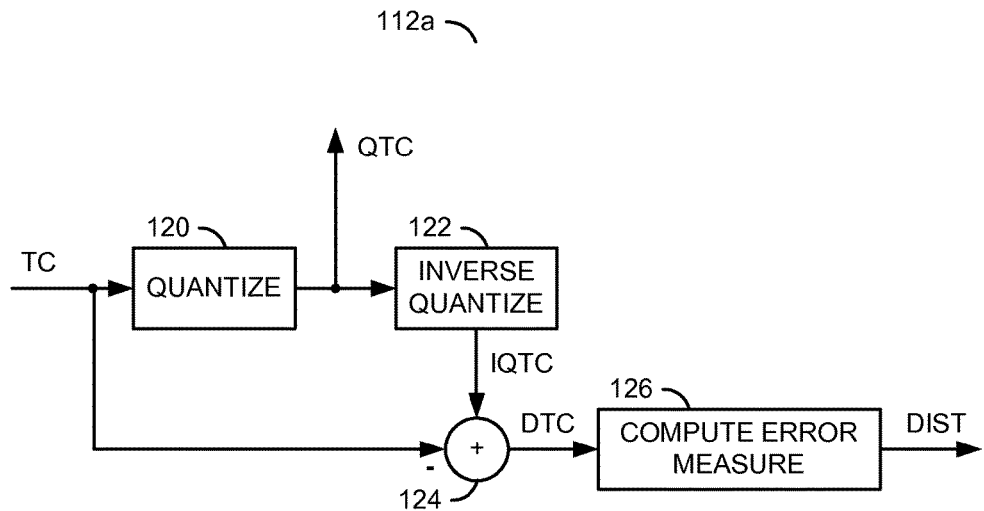
FIG. 4 is a block diagram of a first example implementation of a circuit that computes a distortion measure in a transform domain.

Referring to FIG. 4, a block diagram of a first example implementation of the circuit 112 that computes a distortion measure in the transform domain is shown. The first example implementation may be referred to as a circuit (or module) 112$a$. A coefficient distortion value (e.g., D1[K]) for a transform coefficient K is generally computed by the circuit 112$a$ as a difference between the original transform coefficient and reconstructed version of the original transform coefficient.

The circuit 112a generally comprises a circuit (or module) 120, a circuit (or module) 122, a circuit (or module) 124 and a circuit (or module) 126. The signal TC may be received by the circuit 120 and a first input of the circuit 124. The signal QTC may be generated by the circuit 120 and received by the circuit 114 (FIG. 2) and the circuit 122. A signal (e.g., IQTC) may be generated by the circuit 122 and presented to a second input of the circuit 124. The circuit 124 may generate a signal (e.g., DTC) that is received by the circuit 126. The signal DIST may be generated by the circuit 126. The circuits 120 to 126 may be implemented in hardware, software, firmware or any combination thereof.

The circuit 120 may implement a quantization circuit. The circuit 120 may be operational to quantize the transform coefficients, as controlled by the circuit 110. The quantized transform coefficients may be conveyed in the signal QTC.

The circuit 122 may implement an inverse quantization circuit. The circuit 122 is generally operational to inverse quantize the quantized transform coefficient received in the signal QTC. The resulting reconstructed coefficients may be presented in the signal IQTC to the circuit 124.

The circuit 124 may implement a subtraction circuit. The circuit 124 is generally operational to compute the coefficient distortion value D1[K] for the transform coefficient K by subtracting the original (unquantized) transform coefficient value (e.g., U[K]) from the reconstructed (inverse quantized) transform coefficient value (e.g., I[K]) per equation 1 as follows:

$$D1[K]=I[K]-U[K] \quad \text{Eq. (1)}$$

The above computation may be a direct measure of the distortion in the reconstructed picture. If D1[K]=0, no quantization noise has been introduced by the circuits 120 and 122 and the compression of the transform coefficient K may be lossless. If D1[K]≠0, a quantization noise has been introduced in the reconstructed transform coefficient K by the circuits 120 and 122 and the compression may be lossy. The coefficient distortion values D1 may be presented in the signal DTC to the circuit 126.

The circuit 126 may implement an error measurement computation circuit. The circuit 126 is generally operational to compute the block distortion value (e.g., BD) of a block from the individual coefficient distortion values D1. The coefficient distortion values D1 may be combined to compute the block distortion value BD based on the mode. In some embodiments, the combination may be a weighted sum of the distortions squared per equation 2 as follows:

$$BD = \sum_{K=1}^{K=N} W1[k] \times D1[K] \times D1[K] \quad \text{Eq. (2)}$$

where N may be the number of coefficients in the block or macroblock for which the mode is being determined and W1[K] may be fixed weights. The block distortion value BD may be presented in the signal DIST to the circuit 118. The circuit 118 may subsequently combine the block distortion value BD with the rate value as before to compute the score for the mode.

Figure 5:
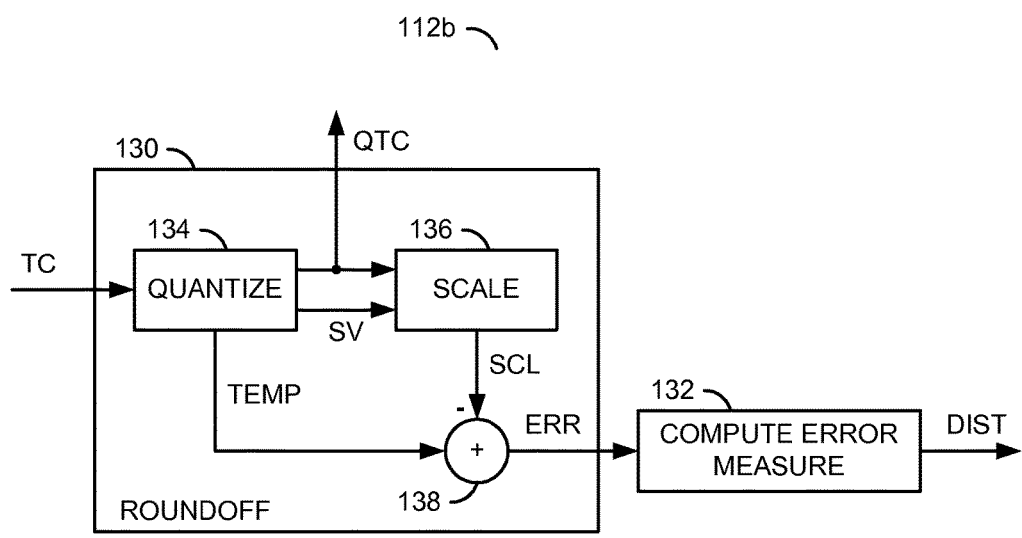
FIG. 5 is a block diagram of a second example implementation of a circuit that computes a distortion measure in the transform domain.

Referring to FIG. 5, a block diagram of a second example implementation of the circuit 112 that computes a distortion measure in the transform domain is shown. The second example implementation may be referred to as a circuit (or module) 112b. A coefficient distortion value (e.g., D2[K]) for a transform coefficient K is generally computed by the circuit 112b as a roundoff that results from the quantization process.

The circuit 112b generally comprises a circuit (or module) 130 and a circuit (or module) 132. The signal TC may be received by the circuit 130. The signal QTC may be generated by the circuit 130 and received by the circuit 114 (FIG. 2). A signal (e.g., ERR) may be generated by the circuit 130 and received by the circuit 132. The signal DIST may be generated by the circuit 132. The circuits 130 and 132 may be implemented in hardware, software, firmware or any combination thereof.

The circuit 130 generally comprises a circuit (or module) 134, a circuit (or module) 136 and a circuit (or module) 138. A signal (e.g., TEMP) may be generated by the circuit 134 and received at a first input of the circuit 138. The signal QTC may be generated by the circuit 134 and received by the circuit 136. A signal (e.g., SV) may be generated by the circuit 134 and received by the circuit 136. A signal (e.g., SCL) may be generated by the circuit 136 and presented to a second input of the circuit 138. The circuit 138 may generate the signal ERR that is received by the circuit 132. The circuits 134 to 138 may be implemented in hardware, software, firmware or any combination thereof.

The circuit 130 may implement a roundoff calculation circuit. The circuit 130 is generally operational to calculate roundoff error values caused by quantizing the transform coefficients received in the signal TC. The roundoff error values may be presented in the signal ERR to the circuit 132. The roundoff error values may be calculated by the circuits 134-138 as follows.

The circuit 134 may implement a quantization circuit. The circuit 134 may be operational to quantize the transform coefficients, as controlled by the circuit 110. Quantization may be based on a shift value. The quantized transform coefficient values may be conveyed in the signal QTC. The shift value may be presented in the signal SV. The circuit 134 may also be operational to generate temporary transform coefficient values. The temporary transform coefficient values may be scaled absolute value versions of the transform coefficient values. The temporary transform coefficient values may be presented in the signal TEMP to the circuit 138. In some embodiments, the circuit 134 may be used in place of the circuit 120 within the circuit 112a with the signal TEMP remaining unused.

The circuit 136 may implement a scale circuit. The circuit 136 is generally operational to scale (multiply) the quantized transform coefficient of the signal QTC by the shift value to generated a scaled value. The scaled value generally represent original inverse transform sample that may be created if no roundoff error occurs. The scaled value may be presented in the signal SCL to the circuit 138.

The circuit 138 generally implements a computation circuit. The circuit 138 is generally operational to compute the coefficient distortion value D2[K] by subtracting the scaled value from the temporary transform coefficient value. The above computation may be a direct measure of the distortion in the reconstructed picture. If D2[K]=0, no roundoff error has been introduced by the circuit 134 and the compression of the transform coefficient K may be lossless. If D2[K]≠0, a roundoff error has been introduced by the circuit 134 and the compression may be lossy. The coefficient distortion values D2 may be presented in the signal ERR to the circuit 132.

The circuit 132 may implement an error measurement computation circuit. The circuit 132 is generally operational to compute the block distortion value BD from the coefficient distortion values D2 of the individual coefficients. The coefficient distortion values D2 may be combined to compute the block distortion value BD based on the mode. In some embodiments, the combination may be a weighted sum of the distortions squared as illustrated in equation 3 as follows:

$$BD = \sum_{K=1}^{K=N} W2[k] \times D2[K] \times D2[K] \qquad \text{Eq. (3)}$$

where N may be the number of coefficients in the block or macroblock for which the mode is being determined and W2[K] may be fixed weights. The block distortion value BD may be presented in the signal DIST to the circuit 118.

Figure 6:
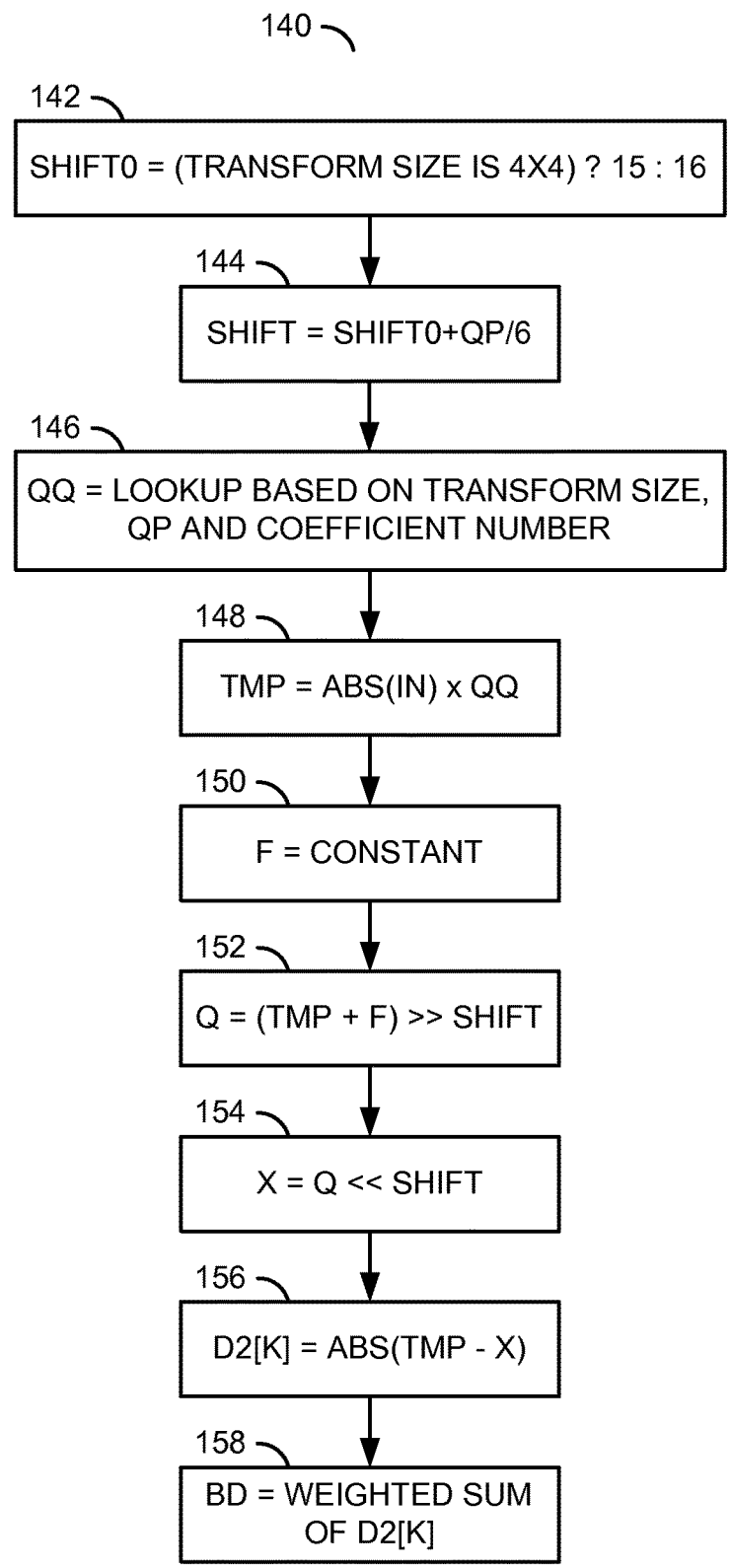
FIG. 6 is a flow diagram of an example distortion calculation involving an H.264 quantization.

Referring to FIG. 6, a flow diagram of an example distortion calculation 140 involving an H.264 quantization is shown. The calculation 140 generally comprises a step (or block) 142, a step (or block) 144, a step (or block) 146, a step (or block) 148, a step (or block) 150, a step (or block) 152, a step (or block) 154, a step (or block) 156 and a step (or block) 158. The steps 142-156 may be performed by the circuit 130. The step 158 may be performed by the circuit 132.

In the step 142, an initial shift value (e.g., SHIFT0) may be determined by the circuit 134 based on the transform size commanded by the circuit 110. Expression "A=B?C:D" generally means that if B is true, A is set to C, else A is set to D. In the step 144, the circuit 134 may generate the shift value (e.g., SHIFT) by offsetting the initial shift value SHIFT0 by a fraction (e.g., ⅙th) of a quantization parameter value (e.g., QP). The quantization parameter value QP may be selected by the circuit 110 for the mode being characterized. The shift value SHIFT may be presented in the signal SV. A scale factor value (e.g., QQ) may be calculated in the step 146 by the circuit 134. Calculation of the scale factor value QQ is generally performed by a lookup operation based on a transform size (e.g., 4×4, 8×8, 16×16), the quantization parameter value QP and the coefficient number K.

In the step 148, a temporary transform coefficient value (e.g., TMP) may be calculated by the circuit 134 based on the original transform coefficient value (e.g., IN) received in the signal TC. The expression "ABS(A)" generally means an absolute value of A. The temporary transform coefficient value TMP may be presented in the signal TEMP to the circuit 138. The circuit 134 may also determine a constant value (e.g., F) in the step 150. A quantized transform coefficient value (e.g., Q) may be calculated by the circuit 134 by right-shifting a sum of the temporary transform coefficient value TMP and the constant value F in the step 152. The expression "A>>B" generally means that A is right shifted by B (e.g., A÷$2^B$ with the fractional part dropped). The quantized transform coefficient value Q may be presented in the signal QTC.

The constant F is usually chosen in an interval [0, $2^{(SHIFT-1)}-1$]. Within the interval, a larger value of the constant F may mean a more accurate quantization for a given quantization parameter. In particular, $F=2^{(SHIFT-1)}-1$ generally quantizes in the center of the quantization bin and is therefore the most accurate quantization. However, a larger constant F is generally more likely to result in a higher bit rate. The constant F is normally calculated by the circuit 110 to maximize subjective decompressed quality.

In the step 154, the scaled value (e.g., X) may be calculated by the circuit 136. The scaled value X generally represents a reconstructed transform coefficient value that would exist if no roundoff error occurred. The scaled value X may be presented in the signal SCL. The expression "A<<B" may mean that A is left shifted by B (e.g., $A \times 2^B$). The circuit 138 may calculate the coefficient distortion value D2[K] in the step 156 as an absolute value of a difference between the temporary transform coefficient value TMP and the scaled value X. Once all of the coefficient distortion values D2 have been calculated for each of the transform coefficients K, the circuit 132 may compute the block distortion value BD for the mode in the step 158. The circuit 118 may subsequently combine the block distortion value BD with the rate value as before to compute the score for the mode.

The functions performed by the diagrams of FIGS. 2-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. A method for estimating a number of bits used to code an image block, comprising the steps of:
    transforming said image block in a circuit to calculate a plurality of transform coefficients;
    quantizing said transform coefficients to calculate a plurality of quantized coefficients;
    counting non-zero ones of said quantized coefficients;
    translating said count of said non-zero quantized coefficients using a curve stored in a lookup table to produce a rate value that estimates said number of bits used to code said image block;
    generating a plurality of intermediate coefficients by calculating absolute values of said transform coefficients; and
    generating a block distortion value based on a difference between scaled versions of said quantized coefficients and said intermediate coefficients.

2. The method according to claim 1, wherein said generation of said block distortion value is independent of a plurality of inverse quantized coefficients corresponding to said quantized coefficients.

3. The method according to claim 1, wherein said curve stored in said lookup table comprises a non-linear curve.

4. The method according to claim 1, further comprising the steps of:
    inverse quantizing said quantized coefficients to calculate a plurality of inverse quantized coefficients; and
    calculating a first difference between a first one of said transform coefficients and a first one of said inverse quantized coefficients.

5. The method according to claim 4, further comprising the step of:
    calculating a second difference between a second one of said transform coefficients and a second one of said inverse quantized coefficients.

6. The method according to claim 1, further comprising the step of:
    generating a score of said image block based on said rate value and said block distortion value.

7. An apparatus comprising:
    a first circuit configured to transform an image block to calculate a plurality of transform coefficients; and
    a second circuit configured to
        (i) quantize said transform coefficients to calculate a plurality of quantized coefficients,
        (ii) count non-zero ones of said quantized coefficients,
        (iii) translate said count of said non-zero quantized coefficients using a curve stored in a lookup table to produce a rate value that estimates a number of bits used to code said image block,
        (iv) generate a plurality of intermediate coefficients by calculating absolute values of said transform coefficients, and
        (v) generate a block distortion value based on a difference between scaled versions of said quantized coefficients and said intermediate coefficients.

8. The apparatus according to claim 7, wherein said generation of said block distortion value is independent of a plurality of inverse quantized coefficients corresponding to said quantized coefficients.

9. The apparatus according to claim 7, wherein said curve stored in said lookup table comprises a non-linear curve.

10. The apparatus according to claim 7, wherein said second circuit is further configured to inverse quantize said quantized coefficients to calculate a plurality of inverse quantized coefficients, and calculate a first difference between a first one of said transform coefficients and a first one of said inverse quantized coefficients.

11. The apparatus according to claim 10, wherein said second circuit is further configured to calculate a second difference between a second one of said transform coefficients and a second one of said inverse quantized coefficients.

12. The apparatus according to claim 7, wherein said second circuit is further configured to generate a score of said image block based on said rate value and said block distortion value.

13. A method for estimating a number of bits used to code an image block, comprising the steps of:
    transforming said image block in a circuit to calculate a plurality of transform coefficients;
    quantizing said transform coefficients to calculate a plurality of quantized coefficients;
    counting non-zero ones of said quantized coefficients;
    translating said count of said non-zero quantized coefficients using a curve stored in a lookup table to produce a rate value that estimates said number of bits used to code said image block;
    inverse quantizing said quantized coefficients to calculate a plurality of inverse quantized coefficients;
    calculating a first difference between a first one of said transform coefficients and a first one of said inverse quantized coefficients;
    calculating a second difference between a second one of said transform coefficients and a second one of said inverse quantized coefficients; and
    generating a block distortion value of said image block based on a combined value of said first difference and said second difference, wherein said combined value is calculated as a weighted sum of squares of said first difference and said second difference.

14. The method according to claim 13, further comprising the step of:
    generating a plurality of intermediate coefficients by calculating absolute values of said transform coefficients.

15. The method according to claim 13, wherein said curve stored in said lookup table comprises a non-linear curve.

16. The method according to claim 13, further comprising the step of:

generating a score of said image block based on said rate value and said block distortion value.

17. An apparatus comprising:

a first circuit configured to transform an image block to calculate a plurality of transform coefficients; and a second circuit configured to
- (i) quantize said transform coefficients to calculate a plurality of quantized coefficients,
- (ii) count non-zero ones of said quantized coefficients,—
- (iii) translate said count of said non-zero quantized coefficients using a curve stored in a lookup table to produce a rate value that estimates a number of bits used to code said image block,
- (iv) inverse quantize said quantized coefficients to calculate a plurality of inverse quantized coefficients,
- (v) calculate a first difference between a first one of said transform coefficients and a first one of said inverse quantized coefficients,
- (vi) calculate a second difference between a second one of said transform coefficients and a second one of said inverse quantized coefficients, and
- (vii) generate a block distortion value of said image block based on a combined value of said first difference and said second difference, wherein said combined value is calculated as a weighted sum of squares of said first difference and said second difference.

18. The apparatus according to claim 17, wherein said second circuit is further configured to generate a plurality of intermediate coefficients by calculating absolute values of said transform coefficients.

19. The apparatus according to claim 17, wherein said curve stored in said lookup table comprises a non-linear curve.

20. The apparatus according to claim 17, wherein said second circuit is further configured to generate a score of said image block based on said rate value and said block distortion value.

* * * * *